US010550790B2

(12) United States Patent
Ravi et al.

(10) Patent No.: US 10,550,790 B2
(45) Date of Patent: Feb. 4, 2020

(54) MULTI-MODE ADVANCED COMBUSTION ENGINE WITH SUPERVISORY CONTROL

(71) Applicants: Robert Bosch LLC, Broadview, IL (US); Robert Bosch GmbH, Stuttgart (DE)

(72) Inventors: Nikhil Ravi, Mountain View, CA (US); Joel Oudart, Mountain View, CA (US); Shyam Jade, Birmingham, MI (US); Jason Schwanke, Southfield, MI (US); Li Jiang, Ann Arbor, MI (US)

(73) Assignees: Robert Bosch LLC, Broadview, IL (US); Robert Bosch GmbH, Stuttgart (DE)

( * ) Notice: Subject to any disclaimer, the term of this patent is extended or adjusted under 35 U.S.C. 154(b) by 723 days.

(21) Appl. No.: 14/984,038

(22) Filed: Dec. 30, 2015

(65) Prior Publication Data

US 2016/0186681 A1 Jun. 30, 2016

Related U.S. Application Data

(60) Provisional application No. 62/098,137, filed on Dec. 30, 2014.

(51) Int. Cl.
*F02D 41/30* (2006.01)
*F02D 41/02* (2006.01)

(52) U.S. Cl.
CPC ..... *F02D 41/3064* (2013.01); *F02D 41/3035* (2013.01); *F02D 41/022* (2013.01); *F02D 41/0225* (2013.01)

(58) Field of Classification Search
CPC ............... F02D 41/022; F02D 41/0225; F02D 41/3035; F02D 41/3041; F02D 41/3064;
(Continued)

(56) References Cited

U.S. PATENT DOCUMENTS 7,422,000 B2 * 9/2008 Kesse ................... F02D 35/023
123/299
7,481,185 B1 * 1/2009 Park ......................... F02B 1/12
123/21
(Continued)

FOREIGN PATENT DOCUMENTS

EP    1867849 A2   12/2007
EP    1867856 A2   12/2007
(Continued)

OTHER PUBLICATIONS

Zhao_2008_Meas._Sci._Technol._19_015409.*
(Continued)

*Primary Examiner* — Carl C Staubach
(74) *Attorney, Agent, or Firm* — Maginot, Moore & Beck LLP

(57) ABSTRACT

An engine system uses data associated with at least one operating condition of an engine to set the engine system to an AI mode when the engine is in an SI mode 1) within first operating condition limits, and 2) when a rate of change of a first operating condition is within rate of change limits, maintain the engine system in the SI mode when the engine is outside of first operating condition limits or when the rate of change of the first operating condition is not within rate of change limits, set the engine system to the SI mode when the engine is in the AI mode outside second operating condition limits, and maintain the engine system in the AI mode when the engine is within second operating condition limits, wherein the second operating condition limits are different from the first operating condition limits.

20 Claims, 4 Drawing Sheets

(58) Field of Classification Search
CPC ............. F02D 41/3076; F02D 41/3023; F02D 41/3029
See application file for complete search history.

(56) References Cited

U.S. PATENT DOCUMENTS

| | | | |
|---|---|---|---|
| 7,729,844 B2 | 6/2010 | Rayl et al. | |
| 2005/0009419 A1* | 1/2005 | Kinoshita | B63H 21/22 440/87 |
| 2006/0196466 A1 | 9/2006 | Kuo et al. | |
| 2006/0243241 A1 | 11/2006 | Kuo et al. | |
| 2007/0028600 A1 | 2/2007 | Ogawa et al. | |
| 2008/0140297 A1 | 6/2008 | Neunteufl | |
| 2008/0283006 A1* | 11/2008 | Sutherland | F01L 13/0015 123/90.15 |
| 2009/0013667 A1* | 1/2009 | Winstead | F02D 13/0207 60/278 |
| 2009/0013668 A1* | 1/2009 | Winstead | F02D 13/0207 60/278 |
| 2009/0031985 A1* | 2/2009 | Kuzuyama | F02B 1/12 123/27 GE |
| 2009/0070002 A1* | 3/2009 | Ishikawa | F02B 15/00 701/103 |
| 2009/0229562 A1 | 9/2009 | Ramappan et al. | |
| 2009/0229564 A1* | 9/2009 | Kang | F01L 1/34 123/295 |
| 2009/0229565 A1* | 9/2009 | Kang | F01L 1/344 123/295 |
| 2009/0312936 A1* | 12/2009 | Kakuya | F02D 13/0207 701/103 |
| 2010/0031924 A1* | 2/2010 | Sun | F02B 1/12 123/435 |
| 2010/0242900 A1* | 9/2010 | Hitomi | F02D 13/0238 123/299 |
| 2011/0067679 A1* | 3/2011 | Hitomi | F02D 41/3035 123/564 |
| 2011/0132318 A1 | 6/2011 | Rayl et al. | |
| 2011/0283971 A1 | 11/2011 | Wermuth et al. | |
| 2013/0073173 A1 | 3/2013 | Hellstrom et al. | |
| 2013/0131957 A1 | 5/2013 | Jiang et al. | |
| 2013/0174805 A1 | 7/2013 | Bayer et al. | |
| 2014/0230784 A1* | 8/2014 | Oudart | F02D 41/3041 123/344 |
| 2014/0230786 A1 | 8/2014 | Ravi et al. | |
| 2014/0352670 A1* | 12/2014 | Surnilla | F02M 26/06 123/568.12 |
| 2016/0017834 A1* | 1/2016 | Yun | F02P 5/045 123/406.47 |

FOREIGN PATENT DOCUMENTS

| | | |
|---|---|---|
| EP | 1921294 A2 | 5/2008 |
| EP | 1936168 A2 | 6/2008 |
| JP | 4986984 B2 | 7/2012 |

OTHER PUBLICATIONS

International Search Report and Written Opinion corresponding to PCT Application No. PCT/US2015/068132, dated Apr. 19, 2016 (9 pages).

Koopmans, L. et al., "Demonstrating a SI-HCCI-SI Mode Change on a Volvo 5-Cylinder Electronic Valve Control Engine", Homogeneous Charge Compression Ignition (HCCI) Combustion 2003 (9 pages).

Milovanovic, N., et al., "SI-HCCI-SI Mode Transition at Different Engine Operating Conditions", Homogeneous Charge Compression Ignition (HCCI) Combustion 2005 (13 pages).

Roelle, M., et al., "Tackling the Transition: A Multi-Mode Combustion Model of SI and HCCI for Mode Transition Control", 2004 International Mechanical Engineering Conference and Exposition, Nov. 13-14, 2004 (8 pages).

Kakuya, H. et al., "Investigation of a SI-HCCI Combustion Switching Control Method in a Multi-Cylinder Gasoline Engine", Hitachi Research Laboratory, Hitachi, Ltd., 2008 (14 pages).

Nier, T. et al., "Analysis of the Combustion Mode Switch Between SI and Gasoline HCCI", Robert Bosch GmbH, 2012 (13 pages).

Widd, A. et al., "Investigating Mode Switch from SI to HCCI using Early Intake Valve Closing and Negative Valve Overlap", Society of Automotive Engineers of Japan, Inc., 2011 (12 pages).

Lu, X. et al., "Auto-ignition and combustion characteristics of n-butanol triggered by low- and high-temperature reactions of mixed n-heptane", Elsevier 2013 (7 pages).

Masurier, J., "Experimental study of the HCCI combustion through the use of minor oxidizing chemical species", Université d'Orléans, 2016 (297 pages).

European Search Report and Written Opinion for Application No. PCT/US2015/068132 (8 pages).

* cited by examiner

MULTI-MODE ADVANCED COMBUSTION ENGINE WITH SUPERVISORY CONTROL

This application claims the benefit of priority of U.S. Provisional Patent Application Ser. No. 62/098,137, filed on Dec. 30, 2014, the disclosure of which is incorporated herein by reference in its entirety.

This invention was made with government support under DE-EE0003533 awarded by the Department of Energy. The government has certain rights in the invention.

TECHNICAL FIELD

This disclosure relates to multi-mode engines capable of operating in different combustion modes.

BACKGROUND

Homogenous Charge Compression Ignition (HCCI) and spark assisted compression ignition (SACI) are advanced combustion concepts for piston engines that offer significant efficiency and emissions benefits over current technologies. The HCCI combustion process has been studied for over two decades, and has shown promise as a potential technology for automotive engines that can improve on the efficiency and emissions capabilities of current technologies.

In HCCI, a homogeneous mixture of air, fuel and hot exhaust gases is compressed until auto-ignition occurs. Consequently, combustion is not initiated by a spark. Rather, precise conditions are established within a cylinder such that simply by compressing the gases exhibiting the necessary thermodynamic conditions within the cylinder ignition is initiated. HCCI is thus highly dependent upon the in-cylinder temperature and composition of gases (i.e., thermodynamic conditions for the mixture). In order to provide a desired temperature for HCCI ignition, a significant amount of hot exhaust gas from the previous combustion cycle is typically trapped within the cylinder to enable this auto-ignition; however, other methods for initiating HCCI have also been tested, including increasing the compression ratio and heating the intake air.

A significant benefit to incorporating HCCI is that HCCI engines can be run fully unthrottled, significantly reducing pumping losses that are typical in a spark-ignited (SI) engine, thereby boosting the efficiency. Additionally, due to the highly diluted reactant mixture and absence of a flame, peak combustion temperatures are much lower, which reduces NOx emissions significantly.

Operating an engine solely in HCCI, however, is not possible because of engine load and speed limitations. Auto-ignition occurs with very high pressure rise rates leading to the phenomenon of ringing at higher loads which is structurally undesirable for the engine. Hence there is a cap on the maximum power output in HCCI. At the low load end, HCCI mode is harder to maintain because the temperature required to auto-ignite cannot be achieved. HCCI mode is also not possible at lower speeds as the chemical breakdown of species to initiate auto-ignition slows down significantly at lower speeds. This leads to unstable operation or misfire.

SACI has been studied as one approach to smoothing the transition between SI and HCCI, and as an alternative to HCCI. In SACI, a spark is used along with compression. The compression in SACI is typically insufficient to induce spontaneous combustion. Accordingly, the spark controls the timing of the ignition. Due to the lower rates of pressure rise, it is possible to run SACI up to much higher loads than HCCI (>5 bar BMEP), while still deriving some of the same benefits in terms of efficiency (due to unthrottled operation). However, due to the presence of a flame and the high temperatures associated therewith, NOx production is non-negligible—therefore it is necessary to operate SACI at stoichiometric conditions (lambda=1), which allows a three-way catalyst to purge the NOx from the exhaust. Thus, while timing can be precisely controlled, the benefits of HCCI are not fully realized. Further, while SACI allows an extension of the HCCI operating range to higher loads, it is still not sufficient to cover the entire operating range of the engine.

Therefore there exists only a limited operational region for running an engine efficiently and stably in HCCI or SACI mode. Accordingly, attempts have been made to incorporate these modes in an automotive engine by combining them with the conventional SI mode. In these approaches, SI mode is used during cold startup periods and while ramping up the engine through low-speed and low loads. In the region of medium to medium-high loads, the engine can be operated in HCCI or SACI mode, maximizing efficiency and minimizing emissions. The mode can be switched back to SI when the power demand exceeds the upper-load limit of these advanced combustion modes.

Transitioning smoothly from one mode to another however, presents additional challenges. For example, maintaining a desired torque during mode switching can be challenging due to the significant differences between SI and HCCI/SACI operating conditions. Therefore, implementation of HCCI/SACI on a production engine requires advanced control algorithms. The control algorithms are complicated due to the lack of a direct ignition trigger (such as a spark), and the cycle-to-cycle dynamics introduced by the trapped exhaust gas in an HCCI mode. Several modeling and control approaches for steady-state and transient control of HCCI have been presented in the literature.

As is evident from the foregoing discussion, transitions between HCCI/SACI and traditional SI mode are necessary both at the low load/speed as well as the mid-high load/speed end of the operating range. This is shown schematically in FIG. 1. In FIG. 1, the region of engine loads/engine speeds wherein HCCI/SACI mode is advantageous is indicated by area 10. The area 12 identifies the allowable operating region of SI mode. Accordingly, as an engine transitions along a trajectory 14 from a low speed/low load condition to a high speed high load condition, the engine will optimally transition from SI mode to HCCI/SACI mode at location 16 and transition from HCCI/SACI mode to SI mode again at location 18. Similarly, as an engine transitions along a trajectory 20 from a high speed/high load condition to a low speed/low load condition, the engine will optimally transition from SI mode to HCCI/SACI mode at location 22 and transition from HCCI/SACI mode to SI mode again at location 24.

Different approaches for switching between SI and advanced combustion modes are known, including single-step switches and transitions that happen more gradually over several cycles. The existing approaches, however, do not incorporate a supervisory control algorithm to determine when switches should be initiated, and when the engine should operate in different combustion modes.

What is needed, therefore, is a control system which determines the most appropriate combustion mode to operate in at any given instant of time, initiates combustion mode switches as necessary, and provides maximal efficiency even during rapid transients and while operating at the boundaries of the different combustion modes.

SUMMARY

In one embodiment, an engine system includes at least one sensor configured to generate data associated with at least one operating condition of an engine, a cylinder of the engine including an inlet valve and an outlet valve, a spark plug operably connected to the cylinder, a memory including program instructions stored therein. The system includes a processor operably connected to the at least one sensor, the inlet valve, the outlet valve, the spark plug and the memory, the processor configured to execute the program instructions to obtain the generated data, based on the obtained data, set the engine system to an advanced ignition (AI) mode when the engine is operating in a spark ignition (SI) mode 1) within first operating condition limits, and 2) when a rate of change of a first operating condition is within first operating condition rate of change limits, based on the obtained data, maintain the engine system in the SI mode when the engine is operating outside of first operating condition limits or when the rate of change of the first operating condition is not within the first operating condition rate of change limits, based on the obtained data, set the engine system to the SI mode when the engine is operating in the AI mode outside second operating condition limits, and based on the obtained data, maintain the engine system in the AI mode when the engine is operating within second operating condition limits, wherein the second operating condition limits are different from the first operating condition limits.

In one or more embodiments, the engine system the processor is further configured to execute the program instructions to maintain the engine system in the AI mode when the engine is operating within second operating condition limits regardless of the rate of change of the first operating condition.

In one or more embodiments, the at least one operating condition of an engine includes engine power, the first operating condition is engine power, setting the engine system to the AI mode is based upon the engine power, maintaining the engine system in the SI mode is based upon the engine power, setting the engine system to the SI mode is based upon the engine power, and maintaining the engine system in the AI mode is based upon the engine power.

In one or more embodiments, the at least one operating condition of an engine includes engine speed, setting the engine system to the AI mode is based upon the engine speed, setting the engine system to the AI mode is further based upon determining that a rate of change of the engine speed is less than a rate of speed change limit, maintaining the engine system in the SI mode is based upon the engine speed, setting the engine system to the SI mode is based upon the engine speed, and maintaining the engine system in the AI mode is based upon the engine speed.

In one or more embodiments, the first operating condition limits include, for a first engine speed, a first lower engine power limit and a first upper engine power limit, the second operating condition limits include, for the first engine speed, a second lower engine power limit and a second upper engine power limit, the second lower engine power limit is less than the first lower engine power limit, and the second upper engine power limit is greater than the first upper engine power limit.

In one or more embodiments, the AI mode is a spark assisted compression ignition mode.

In one or more embodiments, the AI mode is a homogenous charge compression ignition mode.

In one or more embodiments, the at least one operating condition of the engine includes clutch status, setting the engine system to the AI mode is based upon the clutch status, maintaining the engine system in the SI mode is based upon the clutch status, setting the engine system to the SI mode is based upon the clutch status, and maintaining the engine system in the AI mode is based upon the clutch status.

In one or more embodiments, the at least one operating condition of the engine includes gear state, setting the engine system to the AI mode is based upon the gear state, maintaining the engine system in the SI mode is based upon the gear state, setting the engine system to the SI mode is based upon the gear state, and maintaining the engine system in the AI mode is based upon the gear state.

In one or more embodiments, the at least one operating condition of an engine includes mixture thermodynamic conditions, the first operating condition is mixture thermodynamic conditions, setting the engine system to the AI mode is based upon the mixture thermodynamic conditions, maintaining the engine system in the SI mode is based upon the mixture thermodynamic conditions, setting the engine system to the SI mode is based upon the mixture thermodynamic conditions, and maintaining the engine system in the AI mode is based upon the mixture thermodynamic conditions.

In one embodiment, a method of operating an engine system includes generating data associated with at least one operating condition of an engine with at least one sensor, obtaining the generated data with a processor operably connected to the at least one sensor, an inlet valve of a cylinder of the engine, an outlet valve of the cylinder, a spark plug operably connected to the cylinder, and a memory including program instructions stored therein, and executing the program instructions with the processor. Wherein the program instructions are executed to set the engine system to an advanced ignition (AI) mode based on the obtained data when the engine is operating in a spark ignition (SI) mode 1) within first operating condition limits, and 2) when a rate of change of a first operating condition is within first operating condition rate of change limits, maintain the engine system in the SI mode based on the obtained data when the engine is operating outside of first operating condition limits or when the rate of change of the first operating condition is not within the first operating condition rate of change limits, set the engine system to the SI mode based on the obtained data when the engine is operating in the AI mode outside second operating condition limits, and maintain the engine system in the AI mode based on the obtained data when the engine is operating within second operating condition limits, wherein the second operating condition limits are different from the first operating condition limits.

In one or more embodiments, a method of operating an engine system includes executing the program instructions to maintain the engine system in the AI mode when the engine is operating within second operating condition limits regardless of the rate of change of the first operating condition.

In one or more embodiments, generating data comprises generating data associated with engine power, the first operating condition is engine power, setting the engine system to the AI mode is based upon the engine power, maintaining the engine system in the SI mode is based upon the engine power, setting the engine system to the SI mode is based upon the engine power, and maintaining the engine system in the AI mode is based upon the engine power.

In one or more embodiments, generating data includes generating data associated with engine speed, setting the engine system to the AI mode is based upon the engine speed, setting the engine system to the AI mode is further based upon determining that a rate of change of the engine speed is less than a rate of speed change limit, maintaining the engine system in the SI mode is based upon the engine speed, setting the engine system to the SI mode is based upon the engine speed, and maintaining the engine system in the AI mode is based upon the engine speed.

In one or more embodiments, the first operating condition limits of a method include, for a first engine speed, a first lower engine power limit and a first upper engine power limit, the second operating condition limits include, for the first engine speed, a second lower engine power limit and a second upper engine power limit, the second lower engine power limit is less than the first lower engine power limit, and the second upper engine power limit is greater than the first upper engine power limit.

In one or more embodiments, the AI mode of a method is a spark assisted compression ignition mode.

In one or more embodiments, the AI mode of a method is a homogenous charge compression ignition mode.

In one or more embodiments, generating data includes generating data associated with a clutch status of the engine system, setting the engine system to the AI mode is based upon the clutch status, maintaining the engine system in the SI mode is based upon the clutch status, setting the engine system to the SI mode is based upon the clutch status, and maintaining the engine system in the AI mode is based upon the clutch status.

In one or more embodiments, generating data includes generating data associated with a gear state of the engine system, setting the engine system to the AI mode is based upon the gear state, maintaining the engine system in the SI mode is based upon the gear state, setting the engine system to the SI mode is based upon the gear state, and maintaining the engine system in the AI mode is based upon the gear state.

In one or more embodiments, generating data includes generating data associated with mixture thermodynamic conditions, the first operating condition is mixture thermodynamic conditions, setting the engine system to the AI mode is based upon the mixture thermodynamic conditions, maintaining the engine system in the SI mode is based upon the mixture thermodynamic conditions, setting the engine system to the SI mode is based upon the mixture thermodynamic conditions, and maintaining the engine system in the AI mode is based upon the mixture thermodynamic conditions.

DETAILED DESCRIPTION

The present disclosure provides a system with a control algorithm based on knowledge of the current operating condition of a system including both engine states (such as load, engine speed) and vehicle states (such as clutch position, gear state). Based on the current operating mode, different boundaries are defined for the advanced combustion modes, and a set of conditions are defined to determine when to switch into or out of the different combustion modes. In addition to considering the current operating condition, the supervisory control also takes into account the rate of change of operating characteristics such as the load, speed and mixture thermodynamic conditions. This ensures that combustion mode switches out of conventional spark ignition (SI) mode are only initiated when the load/speed trajectory of the engine indicates that the system will realize sufficient time in advanced combustion modes to derive measurable benefits from operating in these modes.

Figure 2:
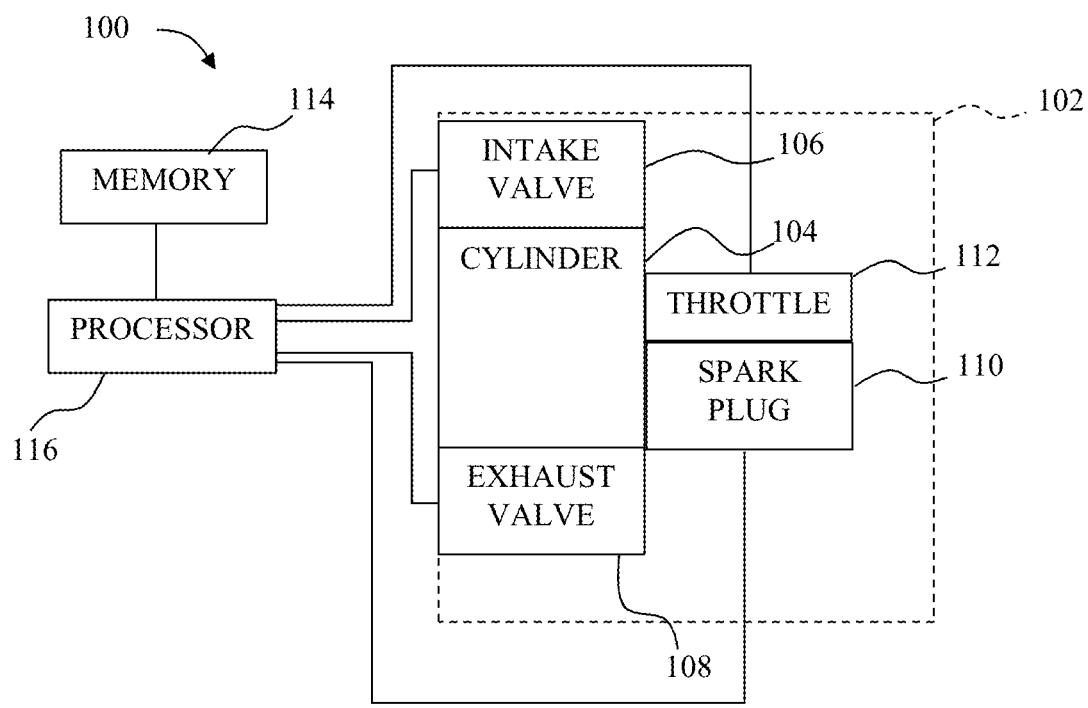
FIG. 2 depicts a system incorporating a command structure for controlling transition between combustion modes

Referring to FIG. 2, an engine system 100 including an engine 102 is depicted. The engine includes at least one cylinder 104. While only one cylinder 104 and associated components are shown, in some embodiments a plurality of cylinders 104 are incorporated. Associated with the cylinder 104 are an engine intake valve 106, an engine exhaust valve 108, and a spark plug 110. A throttle 112 controls flow of air into the cylinder 104. The engine system further includes in one or more embodiments a drive shaft operably connected to the cylinder 104 through a clutch and optionally one or more gears.

The engine system 100 further includes a memory 114 and a processor 116. Various program instructions, discussed in further detail below, are programmed into the memory 114. The processor 116 is operable to execute the program instructions programmed into the memory 114. The processor 116 is operably connected to the engine intake valve 106, the engine exhaust valve 108, the spark plug 110, and the throttle 112. The processor 116 is also operably connected to other sensors and controllers, some of which are described in further detail below.

Figure 3:
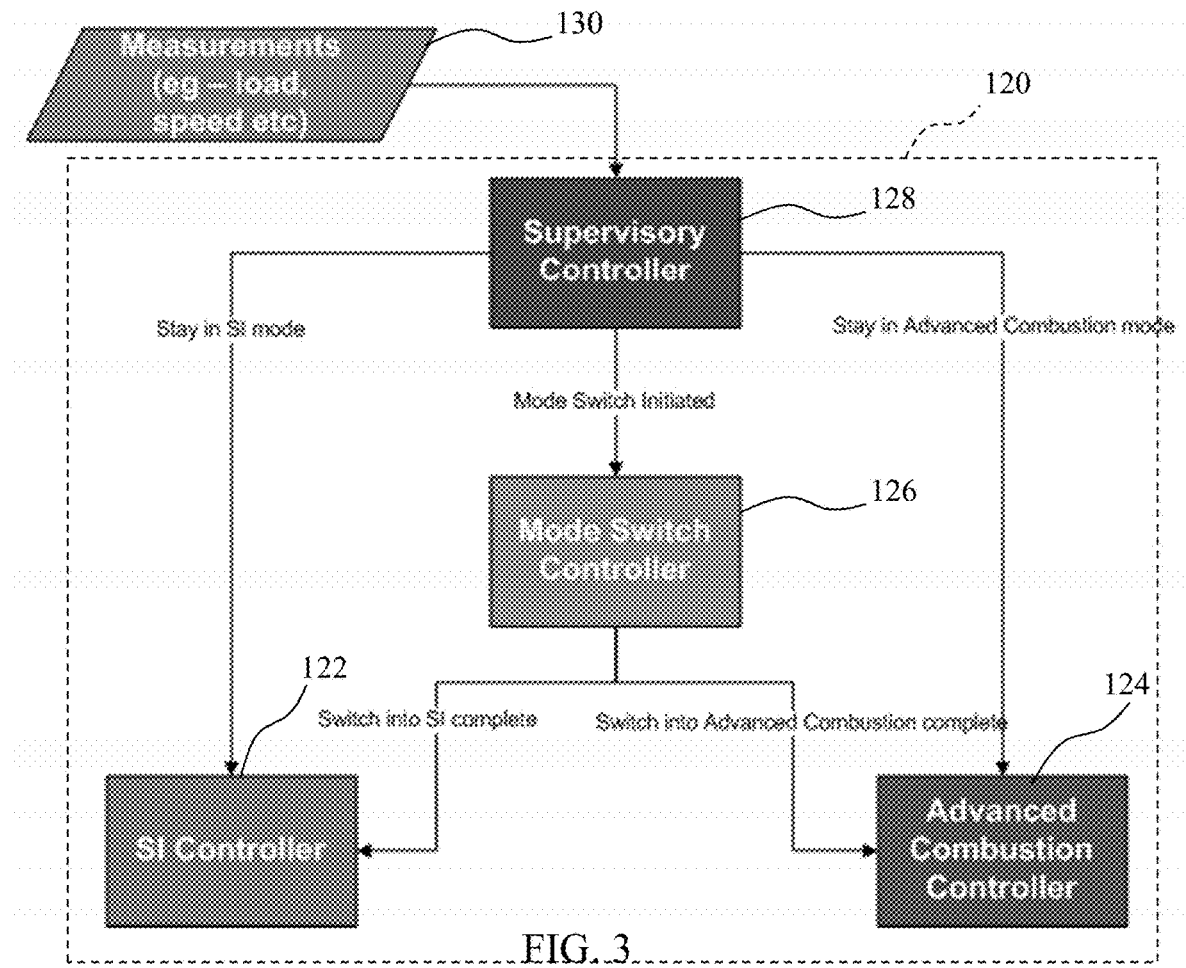
FIG. 3 depicts a command structure for controlling operation of the multi-mode engine.

The processor 116 executes the program instructions stored within the memory 114 to provide a command structure 120 depicted in FIG. 3. The command structure 120 includes an SI controller 122, an advanced combustion controller 124, a mode switch controller 126, and a supervisory controller 128. The SI controller 122 controls engine function while in SI mode and the advanced combustion controller 124 controls engine function while in advanced combustion mode.

The supervisory controller 128 receives inputs 130 from various sensors to ascertain both engine states (such as load, engine speed) and vehicle states (such as clutch position, gear state). Based on the engine states, vehicle states, and current operating mode, the supervisory controller 128 defines or uses different boundaries for the region of engine loads/engine speeds wherein advanced combustion modes are to be implemented. The supervisory controller 128 also uses or defines different sets of conditions for when to switch into or out of the different combustion modes based on the engine states, vehicle states, and current operating mode. The switching conditions include a consideration of the rate of change of operating characteristics such as the load, speed and mixture thermodynamic conditions. When the supervisory controller 128 determines that a switch is desired, the supervisory controller 128 controls the mode switch controller 126 to switch to the desired mode.

Figure 4:
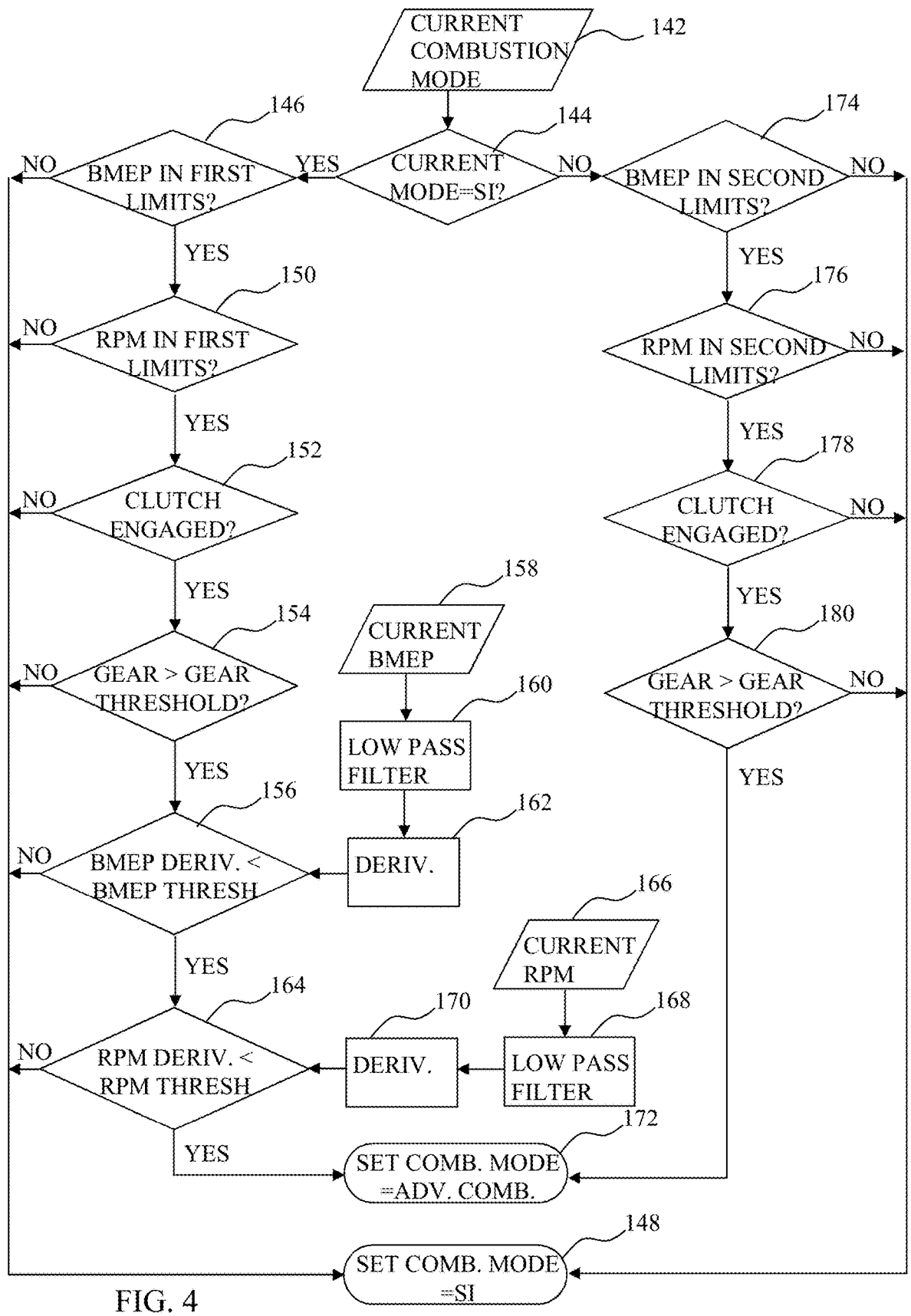
FIG. 4 depicts a process executed by the supervisory controller of FIG. 3.

In one embodiment, the supervisory controller 128 executes the program instructions stored in the memory 114 to implement the algorithm or process 140 of FIG. 4. At block 142, the current combustion mode is provided to the supervisory controller 128. The supervisory controller 128 then determines if the current mode is SI mode (block 144). If the current mode is SI mode, the process continues to block 146 and the supervisory controller 128 determines if the current power provided by the engine 102 is within first limits for advanced combustion. In one embodiment, the supervisory controller 128 uses brake mean effective pressure (BMEP) based upon data provided to the processor 116 from one or more sensors as a performance metric for power, although other metrics are used in other embodiments.

If the BMEP is not within the first limits for advanced combustion, the process continues to block 148 and the combustion mode for the next cycle is set to (i.e., remains in) SI mode.

If the BMEP is within the first limits for advanced combustion, various vehicle states are obtained and compared to threshold values. Accordingly, in this embodiment the process continues to block 150 and the supervisory controller 128 determines if the engine RPM is within first RPM limits for advanced combustion based upon data provided to the processor 116 from one or more sensors. If the engine RPM is not within the first RPM limits for advanced combustion, the process continues to block 148 and the combustion mode for the next cycle is set to (i.e., remains in) SI mode.

If the engine RPM is within the first RPM limits for advanced combustion, the process continues to block 152 and the supervisory controller 128 determines if the clutch is engaged for embodiments including a clutch based upon data provided to the processor 116 from one or more sensors. Knowledge of the clutch state can be used to ensure that the engine is transitioned to SI mode anytime the clutch is depressed by the driver to prevent any unstable dynamics in advanced combustion. Accordingly, in this embodiment if the clutch is not engaged, the process continues to block 148 and the combustion mode for the next cycle is set to (i.e., remains in) SI mode.

If the clutch is engaged, the process continues to block 154 and the supervisory controller 128 determines if the current gear is greater than a gear threshold for embodiments including more than one gear. Knowledge of the gear state based upon data provided to the processor 116 from one or more sensors can be used to set a threshold so that in lower gears the engine operates in SI so as to provide adequate torque response to the driver, while in higher gears the engine operates in advanced combustion when possible so as to maximize fuel efficiency. Accordingly, in this embodiment if the current gear is not greater than a gear threshold, the process continues to block 148 and the combustion mode for the next cycle is set to (i.e., remains in) SI mode.

Next, filtered values of the load and speed are used to obtain derivatives of these values, and then compared to upper thresholds. This ensures that if either the load or speed is changing faster than a certain rate when the engine is in SI mode, a switch into advanced combustion is not initiated even if the current operating point falls within the possible advanced combustion region. This ensures that fast transients that will likely move very quickly through the advanced combustion region remain in SI, and rapid switches into and out of advanced combustion (which would take a finite amount of time and potentially involve some penalties in terms of fuel efficiency/smoothness) are prevented.

Accordingly, if the current gear is greater than a gear threshold, the process continues to block 156 and the supervisory controller 128 determines if a BMEP derivative is less than a BMEP threshold. The BMEP derivative is established, for each cycle, by determining or obtaining a current BMEP at block 158. The current BMEP is passed through a low pass filter at block 160, and a derivative is obtained at block 162. If the BMEP derivative is not less than a BMEP threshold, the process continues to block 148 and the combustion mode for the next cycle is set to (i.e., remains in) SI mode.

If the BMEP derivative is less than a BMEP threshold, the process continues to block 164 and the supervisory controller 128 determines if a RPM derivative is less than a RPM threshold. The RPM derivative is established, for each cycle, by determining or obtaining a current RPM at block 1166. The current RPM is passed through a low pass filter at block 168, and a derivative is obtained at block 170. If the RPM derivative is not less than a RPM threshold, the process continues to block 148 and the combustion mode for the next cycle is set to (i.e., remains in) SI mode.

If the RPM derivative is less than a RPM threshold, the process continues to block 172, indicating that a switch into advanced combustion is required on the next engine cycle. The supervisory controller 128 then controls the mode switch controller 126 to switch modes to advanced combustion for the next cycle.

Figure 5:
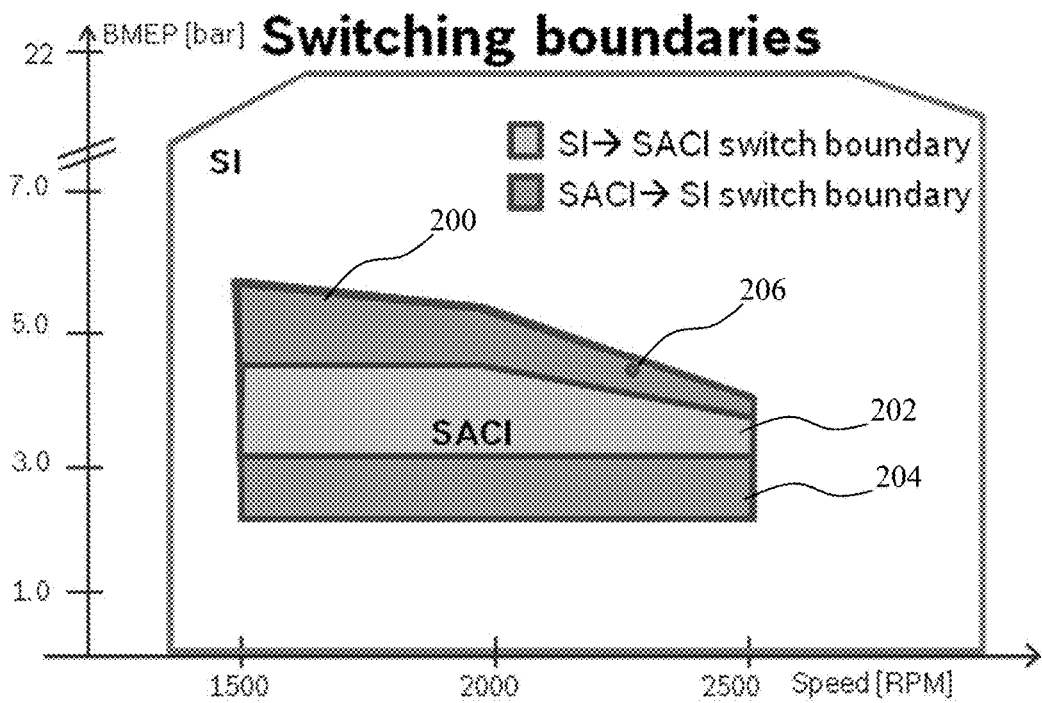
FIG. 5 depicts a schematic of boundaries associated with transitioning between SI and advanced combustion operating modes.

Returning to block 144, if the supervisory controller 128 determines that the current mode is not set to SI (i.e. engine is operating in advanced combustion), then the process continues to block 174 and the supervisory controller 128 determines if the current BMEP is within second limits for advanced combustion. It should be noted that these second limits are likely different from the first limits (though not necessarily so), as shown in FIG. 5.

If the BMEP is not within the second limits for advanced combustion, the process continues to block 148 and the supervisory controller 128 controls the mode switch controller 126 to switch modes to SI mode for the next cycle.

If the BMEP is within the second limits for advanced combustion, the process continues to block 176 and the supervisory controller 128 determines if the engine RPM is within second limits for advanced combustion (also likely different from the first limits) based upon data provided to the processor 116 from one or more sensors. If the engine RPM is not within the second limits for advanced combustion, the process continues to block 148 and the supervisory controller 128 controls the mode switch controller 126 to switch modes to SI mode for the next cycle.

If the engine RPM is within the second limits for advanced combustion at block 176, the process continues to block 178 and the supervisory controller 128 determines if the clutch is engaged, for embodiments including a clutch, based upon data provided to the processor 116 from one or more sensors. If the clutch is not engaged, the process continues to block 148 and the supervisory controller 128 controls the mode switch controller 126 to switch modes to SI mode for the next cycle.

If the clutch is engaged, the process continues to block 180 and the supervisory controller 128 determines if the current gear is greater than a gear threshold, for embodiments including more than one gear, based upon data provided to the processor 116 from one or more sensors. If the current gear is not greater than a gear threshold, the supervisory controller 128 controls the mode switch controller 126 to switch modes to SI mode for the next cycle.

If the current gear is greater than a gear threshold, the process continues to block 172 and the supervisory controller 128 maintains the mode in advanced combustion for the next cycle.

Accordingly, while in advanced combustion mode, the power and speed derivative checks are not performed. Consequently, regardless of the rate change of power and speed, the engine continues to stay in advanced combustion. This maximizes time spent in the advanced combustion mode. Only when an actual load/speed boundary is reached does the mode switch to the SI mode. In the embodiment above, the analysis for clutch status and current gear is the same for both blocks 152/178 and blocks 154/180, respectively. Different limits, however, are used for the power and speed analysis under SI mode and advanced combustion mode. The limits used in blocks 146 and 150 are more restrictive than the limits used in blocks 174 and 176. Thus, for a given speed and power, the system may operate in either SI mode or advanced combustion mode depending upon the mode used for the previous cycle.

The more restrictive limits of blocks 146 and 150 are explained with reference to FIG. 5. FIG. 5 depicts a chart of power and speed with regions 200, 202, and 204. The regions 200, 202, and 204 define the speed and power limits which are used in the analysis of blocks 146, 150, 174, and 176 for an embodiment wherein the advanced combustion mode is a SACI mode. Applying the process 140 to the limits defined by FIG. 5, when the system 100 is operating in SI mode, the analysis of blocks 146 and 150 determines if the present power and speed point is located within the area 202. If so, then the process continues to block 152. If the point of present power and speed is not located within the area 202, then the process continues to block 148. When the system 100 is operating in advanced combustion mode, the analysis of blocks 174 and 176 determines if the present power and speed point is located within any of the areas 200, 202, and 204. If so, then the process continues to block 178. If the present power and speed is not located within the areas 200, 202, and 204, then the process continues to block 148.

Consequently, if the present power and speed is at point 206 and the system is already operating in advance combustion mode, the system will continue to operate in advance combustion mode. If, however, the present power and speed is at point 206 and the system is already operating in SI mode, the system will continue to operate in SI mode. As evident from FIG. 5, in some embodiments the analysis of blocks 146 and 150 (or 174 and 176) is conducted substantially simultaneously, since the regions 200 and 202 are not perfect rectangles.

Figure 1:
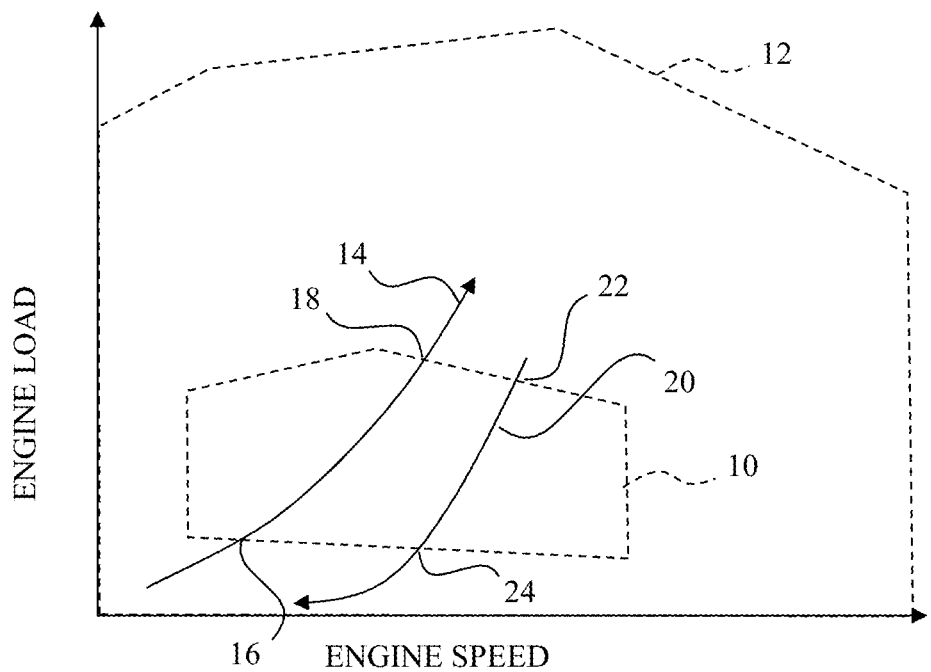
FIG. 1 depicts a schematic of SI and HCCI operating regimes and transitions between them.

The more restrictive boundaries for switching into advanced combustion ensure that there is a hysteresis region that prevents oscillatory switching between combustion modes (therefore having a single boundary as shown in FIG. 1 would not be sufficient). Further, the smaller region 202 indicates that there is a tighter tolerance for switching into advanced combustion (due to possible penalties incurred during the switching process itself), but that once a transition into advanced combustion has been effected, the engine stays in this combustion mode over as large an operating region as possible to maximize time in advanced combustion.

The different regions and their associated load/speed boundaries for switching in and out of advanced combustion in various embodiments is set based on experimental or simulation data based on various metrics such as switching controller performance (in terms of robustness, fuel efficiency and smoothness of the mode transition), fuel efficiency benefit of advanced combustion etc. Moreover, while FIG. 4 only shows consideration of load and speed, other operating conditions are additionally or alternatively considered in other embodiments. Such operating conditions include mixture thermodynamic conditions, environmental conditions, engine hardware states, and vehicle level states. Boundaries for these other operating conditions in different embodiments are defined in order to ensure feasibility of transition from one mode to another.

Figure 6:
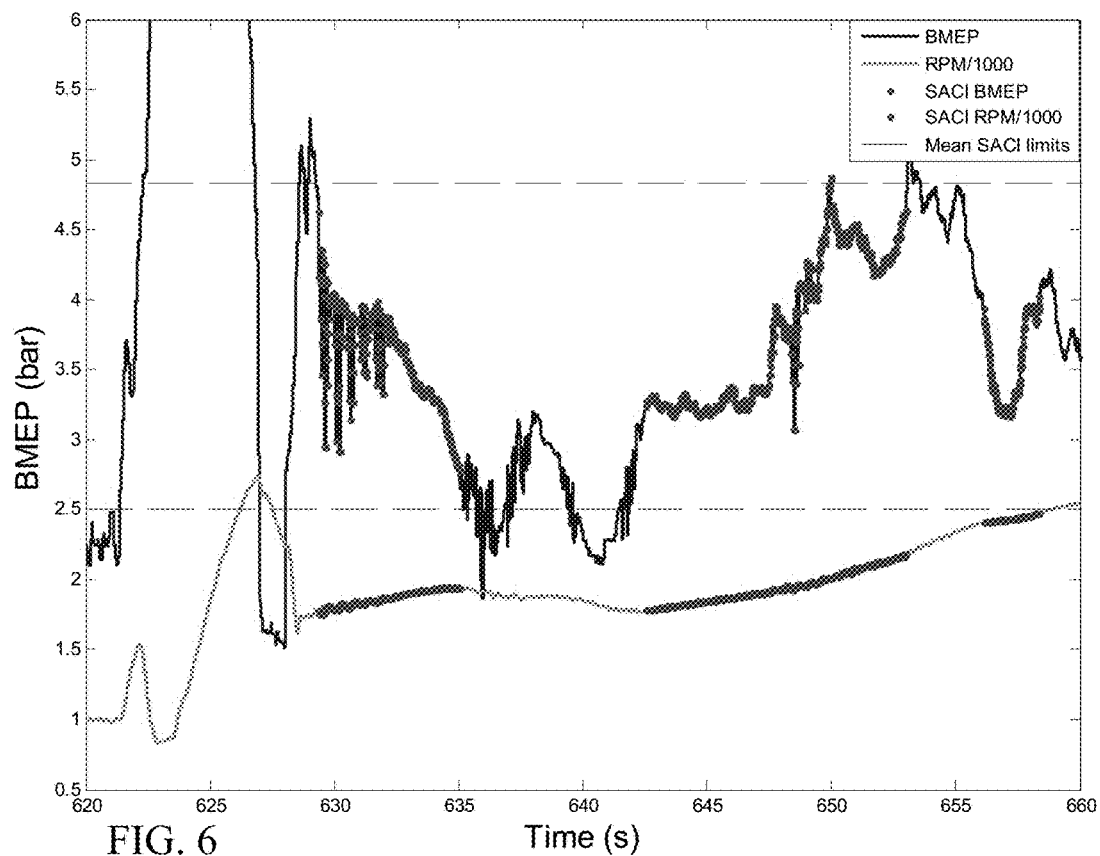
FIG. 6 depicts portions of an exemplary FTP75 drive cycle showing regions where an advanced combustion mode is initiated by a supervisory controller.

The process of FIG. 4 was validated over a portion of an FTP75 drive cycle. In the example, SI and SACI are the only combustion modes allowed. The engine load (in BMEP) and speed during the example are plotted in FIG. 6. In FIG. 6, the portion where the supervisory controller commands the advanced SACI combustion mode is highlighted. As seen, the controller commands a switch into SACI only when load and speed are within the preset bounds, as well as when they change slower than preset values.

Figure 7:
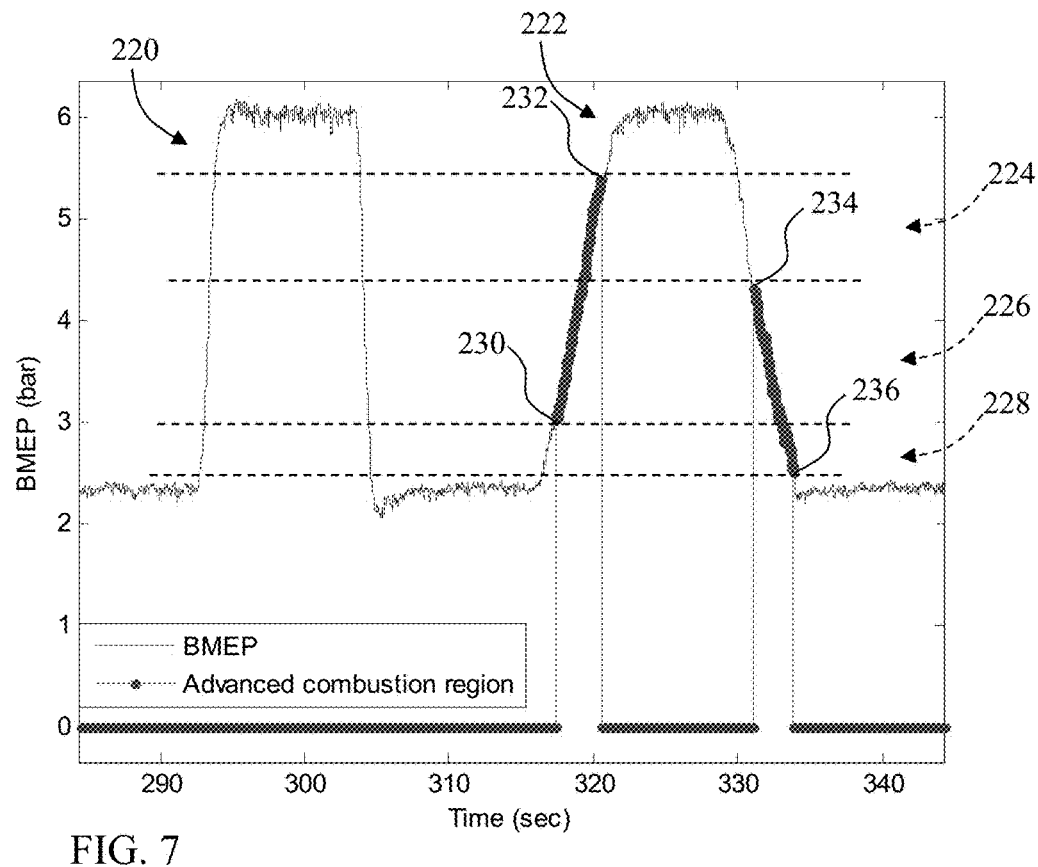
FIG. 7 depicts supervisory control command during load ramps wherein switch into advanced combustion mode is commanded for slower transient and is not commanded for faster transients.

FIG. 7 depicts the rate-dependent controller commands. In FIG. 7, two load ramps 220 and 222 are shown. The ramp 220 is much faster than the ramp 222. As depicted in FIG. 7, the controller only commands advanced combustion during the ramp 222 which is slower, thereby preventing very rapid switches into and out of advanced combustion which could have adverse effects such as reduced fuel efficiency and rough engine operation.

FIG. 7 further shows the effect of the more restrictive regions for initiating advanced combustion, with regions 224, 226, and 228 corresponding to regions 200, 202, and 204 of FIG. 5. In FIG. 7, as BMEP is increasing, advanced combustion mode is initiated at a BMEP 230 and continues until BMEP 232. When BMEP is decreasing, advanced combustion mode is initiated at a BMEP 234 and continues until BMEP 236. The BMEP 232 is higher than the BMEP 234, and the BMEP 236 is lower than the BMEP 230, indicating advanced combustion is initiated only within the region 202, and that once in advanced combustion mode (i.e., in region 202 of FIG. 5), the system stays in advanced combustion mode until exiting the outer regions 206 and 204.

For simplicity, the examples above were limited to a scenario where there is only one advanced combustion mode (SACI) in addition to standard SI. In different embodiments, however, the control strategy is incorporated for multiple advanced combustion modes, each with its own operating region, and the algorithm described above extended to account for them.

The present disclosure thus provides a system with a control algorithm based on knowledge of the current operating condition of an engine system including both engine states (such as load, engine speed) and vehicle states (such as clutch position, gear state). Based on the current operating mode, different boundaries are defined for the advanced combustion modes, and a set of conditions are defined to determine when to switch into or out of the different combustion modes. In addition to considering the current operating condition, the supervisory control also takes into account the rate of change of operating characteristics such as the load, speed and mixture thermodynamic conditions. This ensures that combustion mode switches out of conventional spark ignition (SI) mode are only initiated when the load/speed trajectory of the engine indicate that the system will realize sufficient time in advanced combustion modes to derive measurable benefits from operating in these modes.

The disclosed supervisory control is configured to determine the most appropriate combustion mode to operate in at any given point of time. Smooth operation across the entire operating range and maximizing fuel efficiency are two beneficial results of this determination. Maximizing fuel efficiency requires that the time spent in advanced combustion is maximized, while smooth operation requires that transitions between different combustion modes are minimized. In order to achieve both of these, the supervisory control uses one or more checks based on the current operating condition as well as the rate of change of the operating point to determine which combustion mode to operate in. The operating condition can be broadly defined in terms of quantities such as the engine load, speed, mixture thermodynamic conditions, vehicle-levels states (such as clutch, gear, etc.) and environmental conditions. Thus, in some embodiments, the process of FIG. 4 is modified to use any desired operating condition such as mixture thermodynamic conditions as an additional or alternative operating condition. Thus, in one embodiment, mixture thermodynamic conditions and a rate of change of the mixture thermodynamic conditions is used in the process of FIG. 4. Based on this decision, the supervisory control then initiates the appropriate lower level controllers (such as the individual combustion mode controllers and mode switch controllers).

While the description above has been given with focus on a two-mode engine operating in SI and SACI modes, such discussion is provided to demonstrate the operation of one embodiment of the disclosure. Other applications for the disclosure include controlling boundaries for advanced combustion modes such as HCCI that have a limited operating range compared to SI operation, and also for other combustion modes that provide benefits over SI in certain specific regions of the operating map.

The disclosure thus provides a control system incorporating an algorithm for determining which combustion mode to operate in at any given point of time during engine operation. The algorithm provides the ability to differentially determine the desired combustion mode based on the current operating mode, using hysteresis bands on conditions such as engine load and speed. The algorithm includes the consideration of vehicle-level states such as the clutch and gear state in determining which combustion mode to command. Moreover, the algorithm provides the consideration of not just current operating conditions, but also the rate of change of those operating conditions in determining the desired combustion mode.

While the disclosure has been illustrated and described in detail in the drawings and foregoing description, the same should be considered as illustrative and not restrictive in character. Only the preferred embodiments have been presented and all changes, modifications and further applications that come within the spirit of the disclosure are desired to be protected.

The invention claimed is:

1. An engine system, comprising:
at least one sensor configured to generate data associated with at least one operating condition of an engine;
a cylinder of the engine including an inlet valve and an outlet valve;
a spark plug operably connected to the cylinder;
a memory including program instructions stored therein; and
a processor operably connected to the at least one sensor, the inlet valve, the outlet valve, the spark plug and the memory, the processor configured to execute the program instructions to
define a first operating condition region within a spark ignition (SI) mode operating condition region, the first operating condition region further defined within a second operating condition region defined within the SI mode region,
obtain the generated data,
based on the obtained data, set the engine system to an advanced combustion (AC) mode when the engine is operating in a spark ignition (SI) mode within the first operating condition region with a rate of change of a first operating condition is less than a first operating condition rate of change limit,
based on the obtained data, maintain the engine system in the SI mode when the engine is operating in the SI mode within the first operating condition region with the rate of change of the first operating condition not less than the first operating condition rate of change limit,
based on the obtained data, maintain the engine system in the SI mode when the engine is operating in the SI mode within the second operating condition region and outside of the first operating condition region regardless of the rate of change of the first operating condition,
based on the obtained data, set the engine system to the SI mode when the engine is operating in the AC mode outside the second operating condition region, and
based on the obtained data, maintain the engine system in the AC mode when the engine is operating in the AC mode within the second operating condition region.

2. The system of claim 1, wherein the processor is further configured to execute the program instructions to maintain the engine system in the AC mode when the engine is operating within the second operating condition region regardless of the rate of change of the first operating condition.

3. The system of claim 2, wherein:
the at least one operating condition of the engine includes engine power; the first operating condition is engine power;
setting the engine system to the AC mode is based upon the engine power;
maintaining the engine system in the SI mode is based upon the engine power;
setting the engine system to the SI mode is based upon the engine power; and maintaining the engine system in the AC mode is based upon the engine power.

4. The system of claim 3, wherein:
the at least one operating condition of the engine includes engine speed;
setting the engine system to the AC mode is based upon the engine speed;
setting the engine system to the AC mode is further based upon determining that a rate of change of the engine speed is less than a rate of speed change limit;
maintaining the engine system in the SI mode is based upon the engine speed;
setting the engine system to the SI mode is based upon the engine speed; and
maintaining the engine system in the AC mode is based upon the engine speed.

5. The system of claim 4, wherein:
the first operating condition region includes, for a first engine speed, a first lower engine power limit and a first upper engine power limit;
the second operating condition region includes, for the first engine speed, a second lower engine power limit and a second upper engine power limit;
the second lower engine power limit is less than the first lower engine power limit; and
the second upper engine power limit is greater than the first upper engine power limit.

6. The system of claim 5, wherein the AC mode is a spark assisted compression ignition mode.

7. The system of claim 5, wherein the AC mode is a homogenous charge compression ignition mode.

8. The system of claim 5, wherein:
the at least one operating condition of the engine includes a clutch status of the engine system;
setting the engine system to the AC mode is based upon the clutch status;
maintaining the engine system in the SI mode is based upon the clutch status;
setting the engine system to the SI mode is based upon the clutch status; and
maintaining the engine system in the AC mode is based upon the clutch status.

9. The system of claim 8, wherein:
the at least one operating condition of the engine includes a gear state of the engine system;
setting the engine system to the AC mode is based upon the gear state;
maintaining the engine system in the SI mode is based upon the gear state;
setting the engine system to the SI mode is based upon the gear state; and
maintaining the engine system in the AC mode is based upon the gear state.

10. A method of operating an engine system, comprising:
generating data associated with at least one operating condition of an engine with at least one sensor;
obtaining the generated data with a processor operably connected to the at least one sensor, an inlet valve of a cylinder of the engine, an outlet valve of the cylinder, a spark plug operably connected to the cylinder, and a memory including program instructions stored therein; and
executing the program instructions with the processor to
define a first operating condition region within a spark ignition (SI) mode operating condition region, the first operating condition region further defined within a second operating condition region defined within the SI mode region,
set the engine system to an advanced combustion mode based on the obtained data when the engine is operating in a spark ignition (SI) mode within the first operating condition region with when a rate of change of a first operating condition is less than a first operating condition rate of change limit,
maintain the engine system in the SI mode based on the obtained data when the engine is operating in the SI mode within the first operating condition region with the rate of change of the first operating condition not less than the first operating condition rate of change limit,
based on the obtained data, maintain the engine system in the SI mode when the engine is operating in the SI mode within the second operating condition region and outside of the first operating condition region regardless of the rate of change of the first operating condition,
set the engine system to the SI mode based on the obtained data when the engine is operating in the AC mode outside the second operating condition region, and
maintain the engine system in the AC mode based on the obtained data when the engine is operating in the AC mode within the second operating condition region.

11. The method of claim 10, wherein the processor is further configured to execute the program instructions to:
maintain the engine system in the AC mode when the engine is operating within the second operating condition region regardless of the rate of change of the first operating condition.

12. The method of claim 11, wherein:
generating data comprises generating data associated with engine power; the first operating condition is engine power;
setting the engine system to the AC mode is based upon the engine power; maintaining the engine system in the SI mode is based upon the engine power; setting the engine system to the SI mode is based upon the engine power; and
maintaining the engine system in the AC mode is based upon the engine power.

13. The method of claim 12, wherein:
generating data comprises generating data associated with engine speed;
setting the engine system to the AC mode is based upon the engine speed;
setting the engine system to the AC mode is further based upon determining that a rate of change of the engine speed is less than a rate of speed change limit;
maintaining the engine system in the SI mode is based upon the engine speed;
setting the engine system to the SI mode is based upon the engine speed; and
maintaining the engine system in the AC mode is based upon the engine speed.

14. The method of claim 13, wherein:
the first operating condition region includes, for a first engine speed, a first lower engine power limit and a first upper engine power limit;
the second operating condition region includes, for the first engine speed, a second lower engine power limit and a second upper engine power limit;
the second lower engine power limit is less than the first lower engine power limit; and
the second upper engine power limit is greater than the first upper engine power limit.

15. The method of claim 14, wherein the AC mode is a spark assisted compression ignition mode.

16. The method of claim 14, wherein the AC mode is a homogenous charge compression ignition mode.

17. The method of claim 14, wherein:
generating data comprises generating data associated with a clutch status of the engine system;
setting the engine system to the AC mode is based upon the clutch status;
maintaining the engine system in the SI mode is based upon the clutch status;
setting the engine system to the SI mode is based upon the clutch status; and maintaining the engine system in the AC mode is based upon the clutch status.

18. The method of claim 17, wherein:

generating data comprises generating data associated with a gear state of the engine system;

setting the engine system to the AC mode is based upon the gear state;

maintaining the engine system in the SI mode is based upon the gear state;

setting the engine system to the SI mode is based upon the gear state; and maintaining the engine system in the AC mode is based upon the gear state.

19. The method of claim 10, wherein:

the first operating condition region includes, for a first engine speed, a first upper engine power limit;

the second operating condition region includes, for the first engine speed, a second upper engine power limit; and the second upper engine power limit is greater than the first upper engine power limit.

20. The system of claim 1, wherein:

the first operating condition region includes, for a first engine speed, a first upper engine power limit;

the second operating condition region includes, for the first engine speed, a second upper engine power limit; and the second upper engine power limit is greater than the first upper engine power limit.

* * * * *